J. R. COOK.
Wheels for Vehicles.

No. 156,773. Patented Nov. 10, 1874.

Attest:
C. E. Husin
S. J. Clark

Inventor:
J. R. Cook
By Attorney
Thos. S. Sprague

UNITED STATES PATENT OFFICE.

JARED R. COOK, OF LAPEER, MICHIGAN.

IMPROVEMENT IN WHEELS FOR VEHICLES.

Specification forming part of Letters Patent No. 156,773, dated November 10, 1874; application filed May 14, 1874.

*To all whom it may concern:*

Be it known that I, JARED R. COOK, of Lapeer, in the county of Lapeer and State of Michigan, have invented a new and useful Metallic Wheel for Wagons, of which the following is a specification:

This invention relates to a wheel constructed entirely of metal, the hub having a sleeve, which is placed on the axle before the latter is welded up, so as to be behind a collar on the arm; and the hub is secured on the arm by bolting it to this sleeve. The fellies are cast of malleable metal segments, jointed with tongues and grooves at their ends, the entire periphery of the felly part having a central groove, into which the inner face of the tire may expand or be forced in shrinking it on. The spokes are metal tubes, tapered at each end to fit corresponding sockets in the hub and fellies, as more fully hereinafter set forth.

Figure 1:
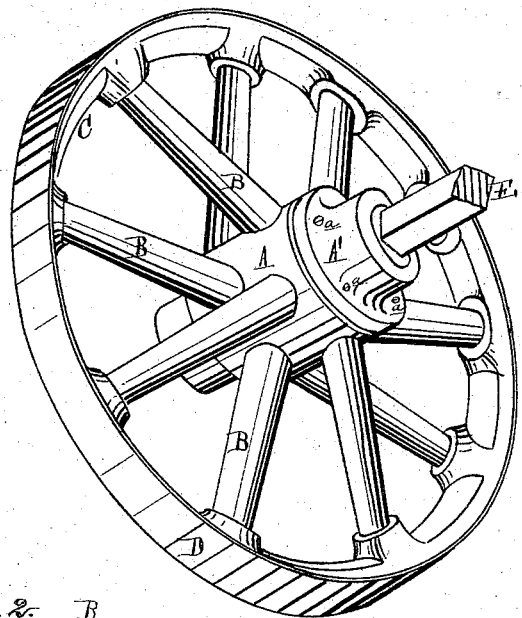
Figure 2:
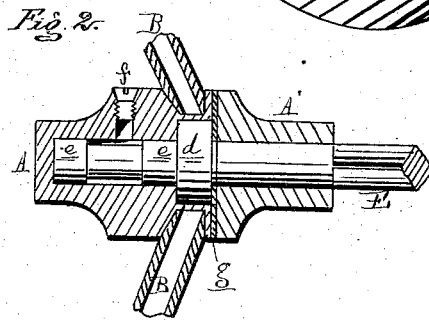
Figure 3:
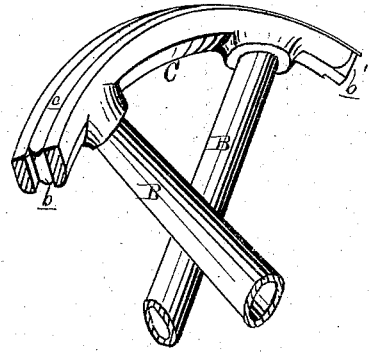
Figure 4:
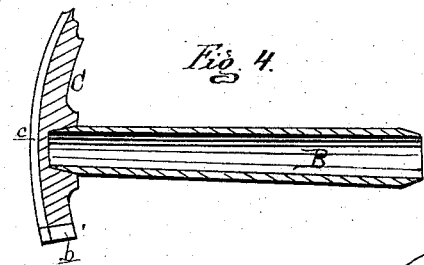

Figure 1 is a perspective view of the wheel and a portion of the axle-arm on which it is mounted. Fig. 2 is a longitudinal section of the hub. Fig. 3 is a perspective view of a felly-section. Fig. 4 is a cross-section of the wheel-rim and a longitudinal section of a spoke inserted therein.

In the drawing, A represents a metallic hub, and A' a sleeve, which forms an extension of the inner end thereof, being secured to the hub proper by the tap-bolts $a$. B are the spokes, each being made of a section of metal tubing, tapered at each end where it enters the sockets in the hub and felly C, which are re-enforced by additional metal where the spoke ends are inserted. The sockets are drilled to the same taper as the spoke ends. The ends of the felly-extensions are tongued and grooved together, as at $b\ b'$, to prevent lateral displacement. On the periphery of the felly is a groove, $c$, into which the central part of the inner wall of the tire D expands when the latter is shrunk on, making also a hollow structure of the wheel, which is not only stronger but lighter than a solid wheel-rim. E is an axle-arm, on which a collar, $d$, is forged, which is received in a recess in the inner end of the hub A. Before the axle-arms are welded up, the sleeves A' are slipped on, so as to bolt on them the hub A to hold the wheel on the axle. The outer end of the hub is closed, and the space between the bearings $e\ e$ of the axle form an oil-reservoir, the oil being introduced through an opening closed by the screw-plug $f$. A soft leather washer, $g$, between the hub and sleeve, prevents the escape of oil.

What I claim as my invention, and desire to secure by Letters Patent, is—

In a metallic wheel, the combination of the hub A, sleeve A', tubular spokes B, fellies C, and tire D, all constructed to operate substantially as described.

JARED R. COOK.

Witnesses:
 THOMAS F. HOWE,
 ASA REYNOLDS.